(12) United States Patent
Bang et al.

(10) Patent No.: US 7,474,771 B2
(45) Date of Patent: Jan. 6, 2009

(54) HANDWRITING TRAJECTORY RECOGNITION SYSTEM AND METHOD

(75) Inventors: Won-Chul Bang, Sungnam-si (KR); Dong-Yoon Kim, Seoul (KR); Wook Chang, Seoul (KR); Kyoung-Ho Kang, Yongin-si (KR); Eun-seok Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 715 days.

(21) Appl. No.: 10/800,771

(22) Filed: Mar. 16, 2004

(65) Prior Publication Data

US 2004/0184659 A1    Sep. 23, 2004

(30) Foreign Application Priority Data

Mar. 17, 2003    (KR) .................... 10-2003-0016413

(51) Int. Cl.
*G06K 9/00*    (2006.01)

(52) U.S. Cl. .................. 382/122; 382/120; 382/187; 382/188; 382/189; 382/313; 382/314

(58) Field of Classification Search ................ None
See application file for complete search history.

(56) References Cited

U.S. PATENT DOCUMENTS

| 3,699,517 | A | | 10/1972 | Dyche |
| 5,828,772 | A | * | 10/1998 | Kashi et al. .................. 382/119 |
| 5,902,968 | A | * | 5/1999 | Sato et al. ................. 178/19.01 |

FOREIGN PATENT DOCUMENTS

| JP | 10307676 A1 | 11/1998 |
| WO | 0062244 A1 | 10/2000 |

\* cited by examiner

*Primary Examiner*—Vikkram Bali
*Assistant Examiner*—Edward Park
(74) *Attorney, Agent, or Firm*—Sughrue Mion, PLLC

(57) ABSTRACT

A handwriting trajectory recognition system, having a motion detection unit adapted to output electric signals based on changes in acceleration of a body of the system in space. A control unit adapted to detect non-stroke regions intervals where the motions of the system body are temporarily stopped and recover handwritings based on the electric signals is provided.

7 Claims, 4 Drawing Sheets

HANDWRITING TRAJECTORY RECOGNITION SYSTEM AND METHOD

CROSS-REFERENCE TO RELATED APPLICATIONS

This application claims the benefit of Korean Patent Application No. 2003-16413, dated Mar. 17, 2003, in the Korean Intellectual Property Office, the disclosure of which is incorporated herein by reference.

BACKGROUND

1. Field

This disclosure teaches techniques related to a handwriting trajectory recognition system, and more particularly, to techniques for recognizing handwriting trajectory in three-dimensional space.

2. Description of the Related Art

Recently the markets for personal mobile devices such as PDAs, cellular phones, notebooks, and so on, have increased. It can be stated that such personal mobile devices are most fit for ubiquitous environments since they are easy to carry and used for information utilization anytime and anywhere. That is, the recent mobile devices enable users to utilize information during their movements so that the users can use information any time and anywhere, unlike the past environments confining information utilization to immobile devices such as desktop personal computers (PCs) installed at homes.

However, while such mobile devices have been made smaller for convenience in carrying, they have become inconvenient in recognizing information and inputting commands through the display part of the devices. In such mobile devices, making it easy to carry runs counter to being easy to input and output information. Therefore, researches and developments have been continuously made on methods for overcoming the problems.

Recently, a pen-type input system has emerged as a means through which users use the mobile devices more conveniently. A general pen-type input system is designed to recognize writing trajectory or selection motions which are input through a two-dimensional plane of an input pad so that the a mobile device displays writing trajectories on a display unit or performs corresponding operations based on recognized information.

FIG. 1 is a view for showing an input style for a conventional pen-type input system. The pen-type input system has a stylus pen part 10 held in a user's hand so that a user can make writing or selecting motions with it. It further includes a display part 22, which may be a PDA 20, for example, that recognizes menu selection commands and/or writing trajectories from a contact state of a portion of the stylus pen part 10 on the two-dimensional plane of the display part 22. The display part displays corresponding operations based on a selected menu or handwritings. Herein, the pen part 10 operates as a pointing tool or handwriting tool without an extra power supply, and the PDA 20 processes a signal corresponding to a portion of the display part 22 on which the tip portion of the pen part 10 is placed.

The pen-type input system as above decides what information is input depending upon positions where the pen part 10 is in contact with the two-dimensional plane of the display part 22. That is, if a current view displayed on the display part 22 is a view displaying menus, the PDA 20 decides information corresponding to a position where the tip portion of the pen part 10 is in contact with as menu selection information. It then executes a corresponding command based on information on the selected position. Further, the PDA 20 obtains information on contact positions of the pen part 10 that are continuously changing, if a view capable of recognizing handwritings is displayed. It then displays on the view of the display part 22 the handwriting trajectory from the obtained information.

The above pen-type input system can more precisely recognize handwritings since a user writes on the display part of two-dimension plane. However, the user must perform his or her menu selections or writing motions within a limited view of the display part 22, which still causes inconvenience in inputting users' input motions.

In order to solve the above problem, systems having motion-detecting sensors inside the pen part 10 and detecting through the sensors users' handwriting trajectories in the three-dimensional space have been proposed in U.S. Pat. No. 6,181,329 (laid-open Jan. 30, 2001) and U.S. Pat. No. 6,212,296 (laid-open Apr. 3, 2001).

The Pen-type input systems disclosed in the U.S. Pat. Nos. 6,181,329 and 6,212,296 can recognize writing motions carried out in the three-dimensional space so that a user can input information without any limit to a writing area. However, these systems have a problem that there exists a high possibility of causing recognition errors since consonants and vowels or diverse symbols such as alphabets and the like are continuously generated when users make writing motions in the three-dimensional space. When most people make writing motions, they write consonants and vowels or symbols such as alphabets and the like in stroked lines separately from each other in order for third parties to more easily grasp the handwritings. While, the above pen-type input system using the writing plane interprets high-frequency signals based on frictions between the pen and the writing plane to recognize stroked lines for consonants, vowels, symbols such as alphabets and the like, the pen-type input system recognizing writing motions in three-dimensional space cannot recognize stroke lines any more since those lines are continuous in the three-dimensional space. Accordingly, when needed to display on a display unit writing trajectories based on writing motions in the three-dimensional space, the system can display only continuous handwriting trajectories that are different from users' intents. This causes a problem since a third party has difficulties in recognizing information.

However, techniques are unavailable for segmenting strokes into only symbols for pure writings with respect to symbols based on writing motions in space without an extra writing plane and recognizing only the symbols for pure writings.

SUMMARY

The disclosed teachings are aimed to overcoming some of the problems discussed above. There is provided a handwriting trajectory recognition system, comprising a motion detection unit adapted to output electric signals based on changes in acceleration of a body of the system in space. A control unit adapted to detect non-stroke regions intervals where the motions of the system body are temporarily stopped and recover handwritings based on the electric signals is provided.

Another aspect of the disclosed teachings is a handwriting trajectory recognition method comprising detecting changes in acceleration of a body of the system in space. Non-stroke regions are detected if there exist intervals where motions of the system body are temporarily stopped. Handwritings are recovered by the system body based on decision results.

BRIEF DESCRIPTION OF THE DRAWINGS

The disclosed teachings will be described in detail with reference to the following drawings in which like reference numerals refer to like elements.

DETAILED DESCRIPTION

Te disclosed teachings will be described in detail herein with reference to the accompanying drawings.

Figure 1:
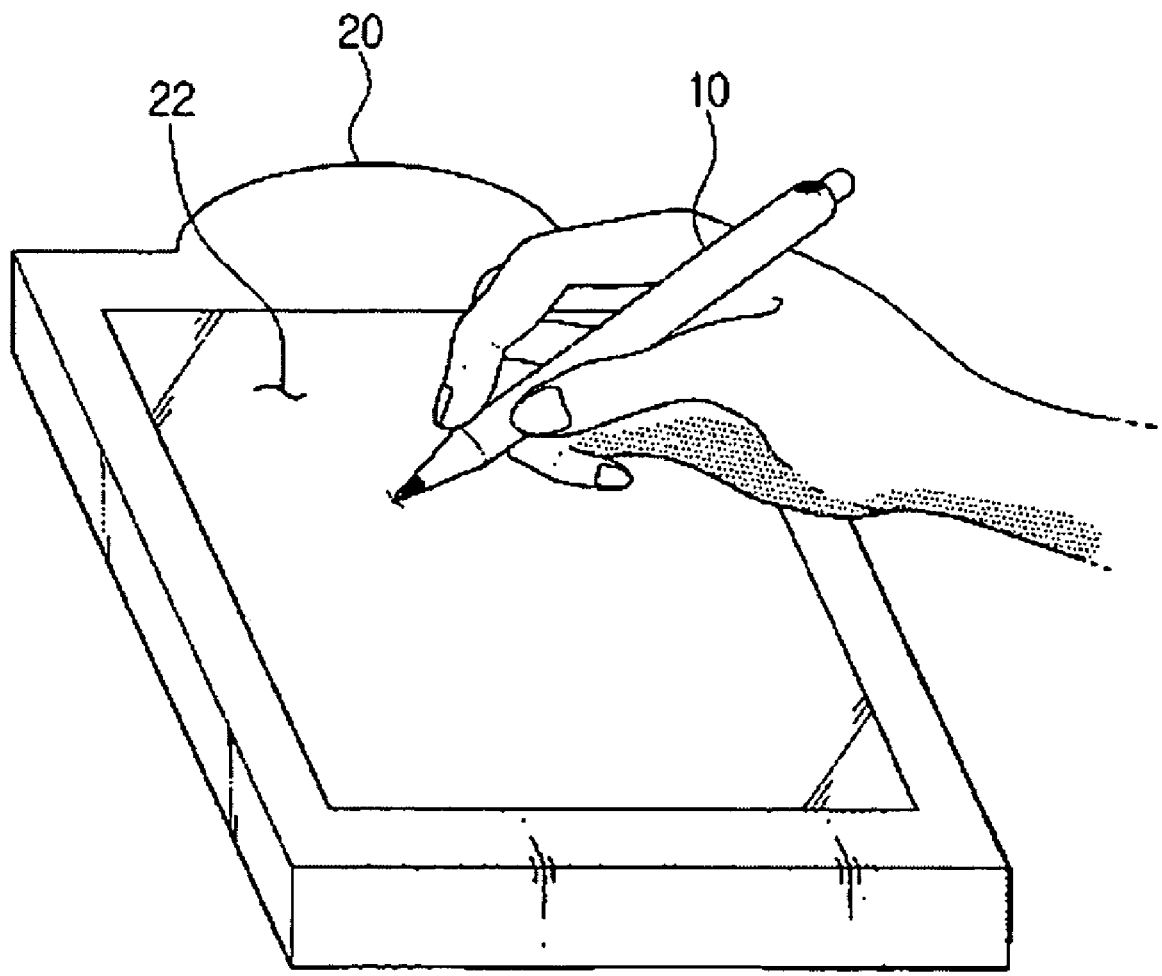
FIG. 1 is a view for showing an input style for a conventional pen-type input system.
Figure 2:
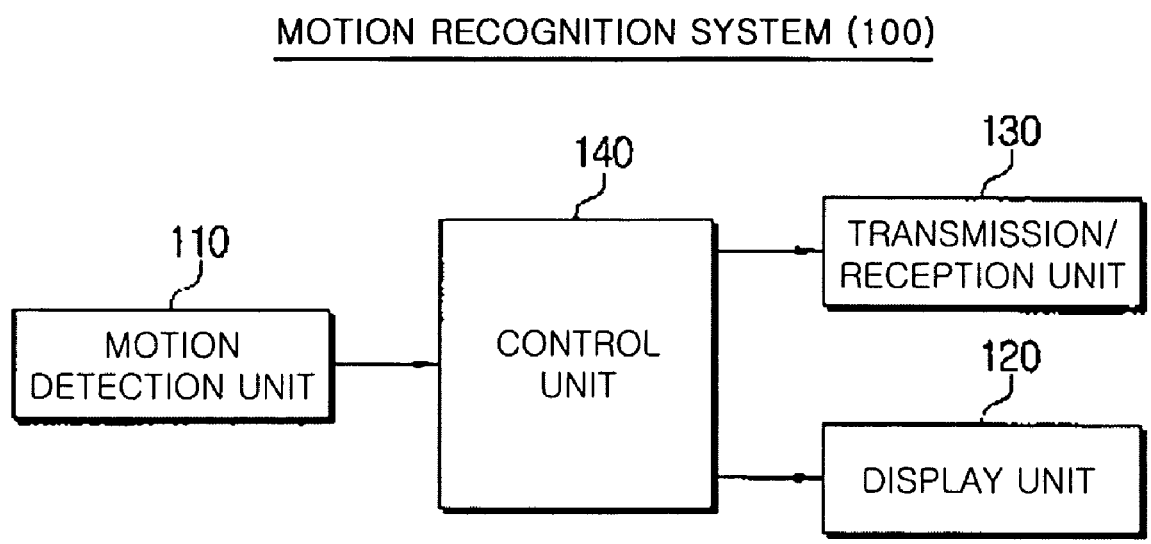
FIG. 2 is a schematic block diagram for showing an exemplary handwriting trajectory recognition system according to some aspects of the disclosed teachings.

FIG. 2 is a schematic block diagram showing an exemplary handwriting trajectory recognition system embodying some aspects of the disclosed teachings. The recognition system 100 has a motion detection unit 110, a display unit 120, a transmission/reception unit 130, and a control unit 140.

The motion detection unit 110 continuously detects acceleration changes and position changes of a body of the system 100. The motion detection unit 110 is structured with plural gyro sensors, plural acceleration sensors for detecting the motion. It further includes a computing circuit for performing computing operations with electric signals transferred from respective sensors.

The display unit 120 displays the motions of the body on its screen. The display unit 120 may be built in the recognition system 100 to be incorporated into one body. Alternately, the displayable unit could be in a different system.

The transmission/reception unit 130 communicates motion information recognized under the controls of the control unit 140 and control signals corresponding to the motion information with other external systems.

The control unit 140 receives acceleration changes and position changes of the body, which are detected from the motion detection unit 110. It recognizes handwriting trajectory in the three-dimensional space made by a user based on information on the acceleration and position changes occurring as the body is moved. At this time, the control unit 140 decides as non-stroke regions temporary stop regions of system body motions based on the information on the detected motions of the system body, and recovers the handwriting trajectory.

In here, the stroked lines can be separated by non-stroke regions from continuous motions of the body along with user's writing motions in space. In other words, it can be stated that a stroked line is the trace of each stroke from the start to the end without any non-stroke region in the three-dimensional space. It is not easy to distinguish a portion of a stroke and a region of meaningless motion between two strokes from handwriting motions performed in the three-dimensional space. However, the system according to the present invention distinguishes strokes through stop motions intentionally performed before the start or after the end of each stroke by a user from handwriting motions in the three-dimensional space.

Obstacles such as hand-shivering exist in actual applications hindering detection of stop motions. While the hand-shivering problem appears to be solvable by a counter measure against the hand-shivering that defines a threshold value for acceleration measurement values and measuring whether measurement values smaller than the threshold value are maintained for a predetermined period of time, if a user turns the system in a different direction, the acceleration is measured to instantly approach to zero. At this time, if the acceleration smaller than the threshold value is maintained for the predetermined period of time, detection errors occur. Accordingly, it can not be stated that a region having the acceleration of nearly zero is a temporary stop region. Since it is difficult for a user to maintain the same acceleration for a certain period of time while making motions with the system, the control unit 140 applies the following conditions to detect temporary stops in the standard deviation for acceleration.

1) For an instant time k, if $\sigma_{|A_n|}^{S}(k) < \sigma_{th}$ for a time interval [k, k+H], at the time, the k is the start $k_1$ of a stroke.

2) For an instant time $k \geq k_1 + W$, if $\sigma_{|A_n|}^{S}(k) > \sigma_{th}$ for a time interval [k, k+H], at the time, (k−S) is the end $k_2$ of the stroke.

Herein, $\sigma_{|A_n|}^{S}(k)$ is a standard deviation for absolute acceleration $|A_n|$ for S samples just before the time k. $\sigma_{th}$ is a threshold value of the standard deviation for the $|A_n|$. W is preset as a minimum time interval for writing one stroke. Further, the H is a minimum time interval for maintaining $\sigma_{|A_n|}^{S}(k)$ smaller than the threshold value $\sigma_{th}$, and set in advance. It is noted here that the end of a stroke in (2) is not the k, but the (k−S) since $\sigma_{|A_n|}^{S}(k)$ is affected by the S samples just before the k.

Figure 3:
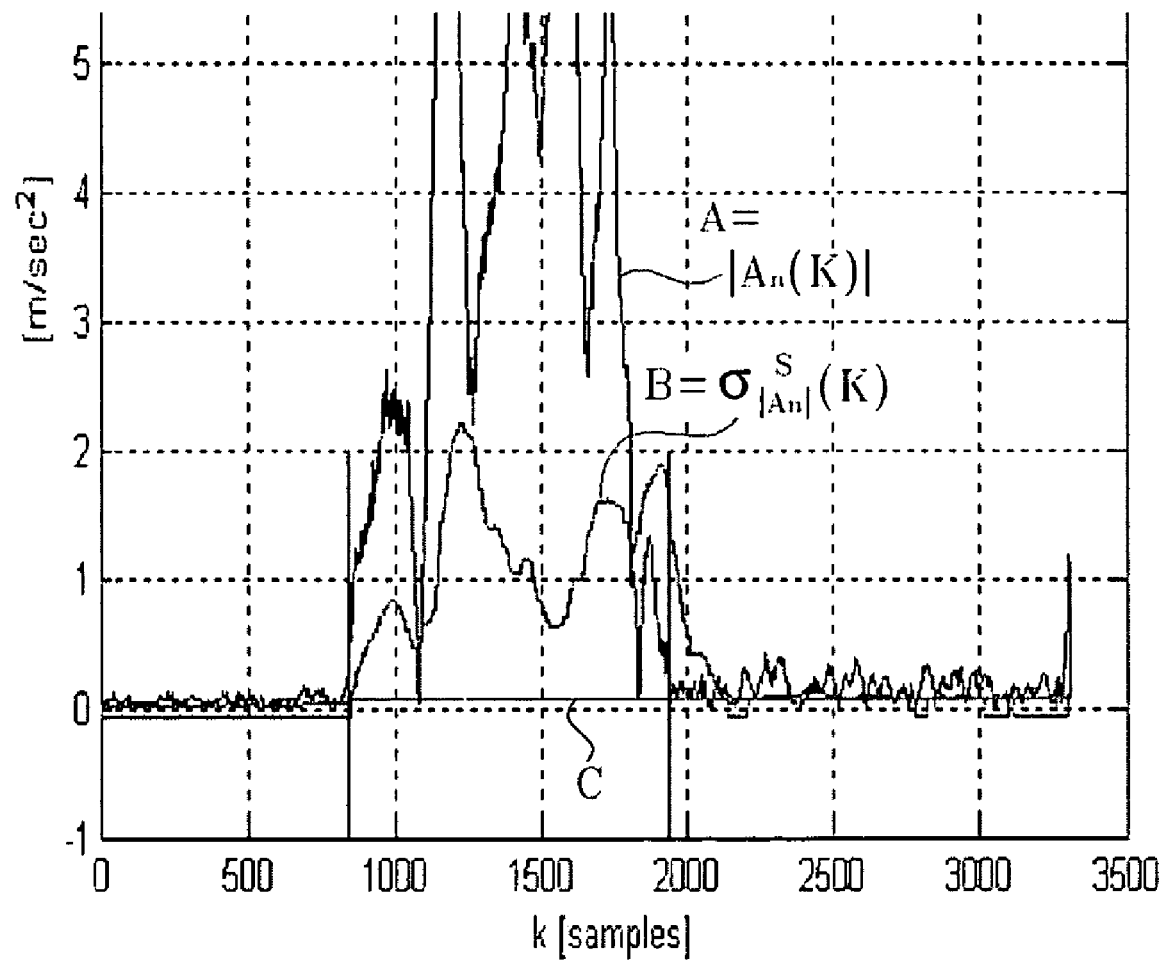
FIG. 3 shows typical shifts of standard deviation of accelerations, and acceleration magnitudes.

FIG. 3 is a view for showing typical shifts of standard deviation versus detected accelerations, and acceleration magnitudes. Further, FIG. 3 shows enlarged portions that indicate the start and end of one stroke in writing motions in space. In FIG. 3, 'A' is a line showing a standard deviation for 100 samples, 'B' is a line showing gravitational acceleration errors in accelerations of the system, and 'C' is a line showing errors between the standard deviation and the threshold value. In the enlarged portions of FIG. 3, the two sample intervals matching in magnitudes indicate regions where temporary stop motions have been performed by a user.

Figure 4:
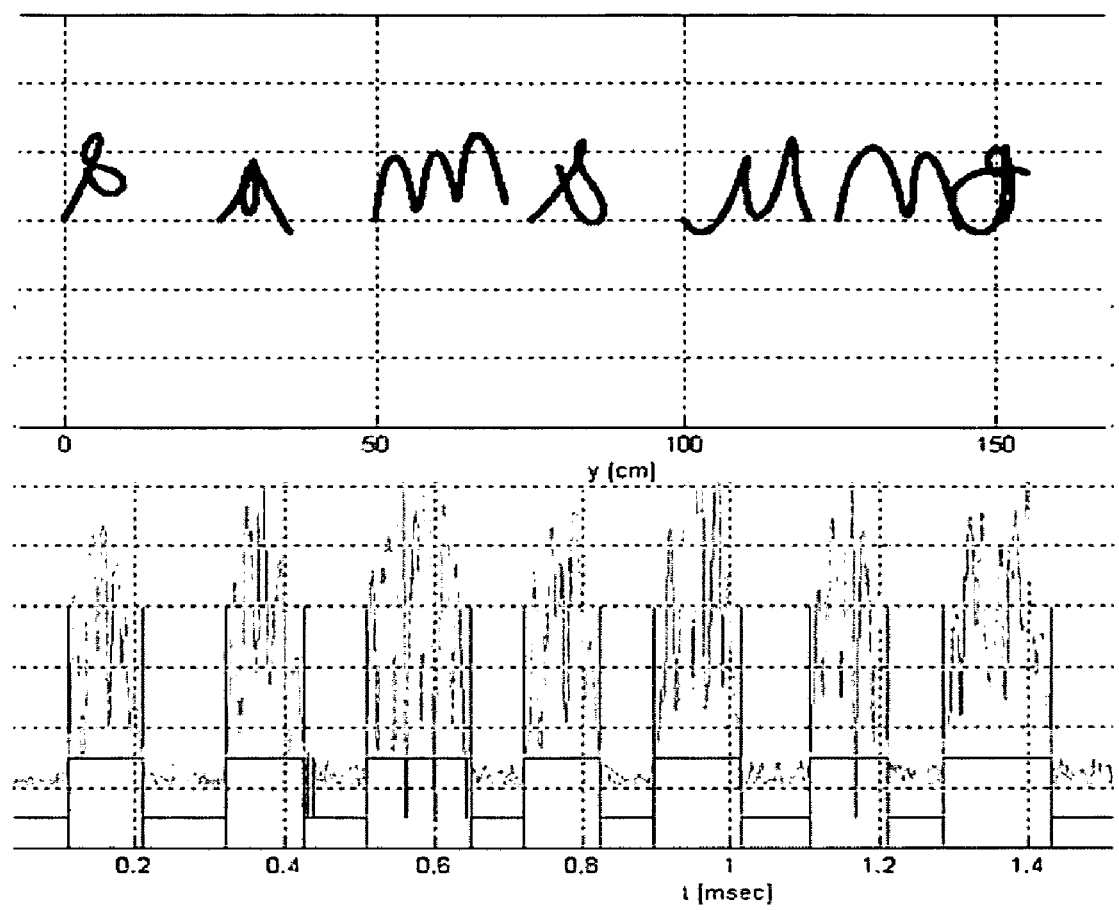
FIG. 4 shows simulation results in which the handwriting trajectory recognition system of FIG. 2 recognizes and displays strokes of "samsung" written in space by using a pen-like body.

FIG. 4 is a view for showing simulation results in which a system recognizes and displays strokes as the pen-type input system of FIG. 2 is used for writing motions of 'samsung' in space. It can be seen that the intervals for pure strokes have somewhat higher acceleration changes and the intervals for temporary stop motions have nearly even accelerations.

As aforementioned, the space handwriting trajectory recognition techniques according to the disclosed teachings can distinguish and more precisely recognize stroked lines from handwriting motions in space, so that it can greatly reduce recognition errors and more clearly display users' intentions on a display unit or the like.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handwriting trajectory recognition system, comprising:

a motion detection unit adapted to output electric signals based on changes in acceleration of a body of the system in space; and a control unit adapted to detect non-stroke regions intervals where the motions of the system body are temporarily stopped and recover handwritings based on the electric signals, wherein the control unit determines an instant time $k_1$ to be a start of a stroke if $\sigma^S_{|A_n|}(k) > \sigma_{th}$ for a time interval [k, k+H], where $\sigma^S_{A_n}$ denotes a standard deviation for accelerations $|A_n|$ for S samples up to the k, $\sigma_{th}$ is a threshold value for the standard deviation, and H is a minimum time interval for which $\sigma^S_{|A_n|}(k)$ is smaller than the threshold value $\sigma_{th}$.

2. The handwriting trajectory recognition system of claim 1, wherein the control unit determines a staff of a stroke by comparing standard deviation of a fixed number of samples of acceleration staffing prior to the start up to a fixed time subsequent to the start against a threshold.

3. The space handwriting trajectory recognition system of claim 1, wherein the control unit determines an end of a stroke by comparing a standard deviation of a fixed number of samples up to the end of the stroke against a threshold.

4. The space handwriting trajectory recognition system of claim 1 wherein the control unit determines (k - S) to be an end of the stroke if $\sigma|^S_{A_n}(k) < \sigma^{th}$ for the time interval [k, k+H] within a time $k \geq k_1 + W$, where W denotes a minimum time interval prescribed for writing one stroke.

5. A handwriting trajectory recognition method comprising:

detecting changes in acceleration of a body of the system in space;

deciding non-stroke regions if there exist intervals where motions of the system body are temporarily stopped; and recovering handwritings by the system body based on decision results, wherein an instant time $k_1$ is determined to be a staff of a stroke if $\sigma^{S|A}_n(k) > \sigma_{th}$ for a time interval [k, k+H], where $\sigma^S_{|A_n|}(k)$ denotes a standard deviation for accelerations $|A_n|$ for S samples up to the k, $\sigma_{th}$ is a threshold value for the standard deviation, and H is a minimum time interval for which $\sigma^S_{A_n}(k)$ is smaller than the threshold value $\sigma_{th}$.

6. The method of claim 5 where a staff of a stroke is determined by comparing standard deviation of a fixed number of samples of acceleration staffing prior to the staff up to a fixed time subsequent to the start against a threshold.

7. The method of claim 5 where an end of a stroke is determined by comparing a standard deviation of a fixed number of samples up to the end of the stroke against a threshold.

* * * * *